Patented May 17, 1938

2,117,478

UNITED STATES PATENT OFFICE 2,117,478

CURING OF MEATS AND THE LIKE

Lloyd A. Hall, Chicago, Ill., assignor to The Griffith Laboratories, Inc., Chicago, Ill., a corporation of Illinois No Drawing. Application August 25, 1934, Serial No. 741,503

6 Claims. (Cl. 99—222)

The present invention relates to cured products and to curing processes and materials for meats, blood and materials containing meat and blood.

The uses of nitrate salt and/or nitrite salt are well known for the production of the red coloration in products containing hemoglobin of blood. These materials do not act directly, but rather, provide substance from which a compound with hemoglobin is formed having a red coloration. This compound is described and identified in the literature as "NO-hemoglobin". Where nitrate without nitrite is used, the nitrate is first reduced to nitrite by bacterial reducing process. Where nitrite is thus formed, or where nitrite is used initially without nitrate, the nitrite is available so that acid which is either present in the meat or is formed in the process, releases nitrous acid. The nitrous acid is the effective agent which reacts with the hemoglobin to form NO-hemoglobin.

In the curing of meats, the action is not immediate and a certain time period is required. One reason for a time period is to provide time for diffusive penetration into the meat. In some cases, as with hams, this time is shortened by pumping liquid pickle into the veins of the meat. Time is also shortened by cutting up the meat into smaller pieces, as in the case of sausage meat. Where nitrate is used without nitrite, time must be provided for the bacteria to produce nitrite. During this time for bacterial reduction, acid also may be formed so that nitrite is converted into nitrous acid. The meat itself may be acid.

Not only is the formation of NO-hemoglobin to be considered, but also the flavor of the meat. Bacterial action occurs in any time period in the curing process to affect or effect the flavor of the meat. This is comparable to the flavor production in butter and cheese by bacterial action. If the curing process is too long, certain undesirable flavors may be created. The flavor is also affected by the kind of bacteria which function, and bacteria are differently flavored according to the alkaline or acid condition (the hydrogen ion concentration or pH) which is maintained.

It is therefore to be understood that time and hydrogen ion concentration are important factors in curing processes. Short times are also valuable from an economic standpoint of tying up investment and apparatus. Mixtures of nitrate and nitrite have long been used for the purpose of shortening the time of curing process.

Nitrous acid itself has not entered into commerce as a distinct ingredient to be added to or compounded with other materials for producing a curing salt or pickle. This is for the reason that nitrous acid is a volatile or fugitive compound which does not exist alone as nitrous acid. It exists freely in aqueous solution. It is formed when a nitrite salt solution is made an acid solution.

The present invention aims to make a curing salt or pickle which includes added substance to impart acidity thereto and to regulate acidity thereof. It aims to use preservative material, which as acid or as its salt, exerts a preservative action on the cured meat, and in the curing process.

Usually, curing processes of this nature are carried out in the presence of common salt or brine of sodium chloride, which in itself has some preservative action. However, it is readily understood that too much such salt cannot be left in the meat without making it too salty. Therefore, where acid substance is added a preservative type is preferred, which has distinctly higher preservative power than sodium chloride.

As preservative types of acid substance both free acids and acid salts may be used, such as monosodium phosphate, tartaric acid, citric acid, malic acid, lactic acid, benzoic acid, salicylic acid, or acid salts of appropriate ones, such as sodium bitartrate, and mono-salts of malic acid or citric acid. Where sodium acid salts are named it is to be understood that sodium is merely illustrative of alkali metal, and that other members of this class, particularly the common member potassium, may be substituted.

Some of these acid preservatives are solid stable crystalline compounds, but others are not available in such form. The physical form limits the manner in which an acid material may be used. Lactic acid for example exists in solution and is so commercially available. Where the acid substance is a solid it may be mixed according to the present invention with a salt mixture containing nitrite or nitrate, or both. Where nitrite and acid substance are together in such a salt mixture the absence of water, in amounts sufficient to form simultaneously a solution of both, is necessary, if it is desired to prevent formation of nitrous acid in the mixture. Where water in such small amount is present, nitrous acid may be formed, and such a moist salt mixture should be sealed or held in a closed container to prevent loss of nitrous acid.

However, since there is potential danger of loss in nitrous acid by natural or accidental accumulation of water in a supposedly dry salt mixture containing the reactive acid and nitrite, it is preferred that the acid be maintained in the mixture, but in separated relation to the nitrite constituent. In the prior art it has been recommended that acid be added at the time the curing salt is to be used on the meat or other product.

There is known a form of curing salt which consists of fine grains of powder-like form of sodium chloride crystals within which may be jacketed small amounts of nitrite, or of nitrate and nitrite, as described in Griffith U. S. Patent No. 2,054,624. With such a mass it is possible to mix solid acid substance with less danger of loss of nitrous acid by action of water. The sodium chloride jacket prevents actual contact of such acid substance with the jacketed nitrite until the sodium chloride jacket is dissolved. It is therefore one aspect of the invention that a combination of dry ingredients be made, one of which is a solid acid substance and the other of which is nitrite salt coated with a partitioning agent, such as sodium chloride in powder-like jacket-form crystals housing nitrite.

The preferred liquid pickle may be any one made in the manner to which the art is accustomed, and to it is added the acid substance. Where nitrite is present, nitrous acid is immediately formed. Where nitrate without nitrite is present, no nitrous acid is formed, but as soon as bacteria generate nitrite, nitrous acid is immediately formed, unless the nitrate is reduced directly to nitrous acid. The mechanism, however, is not material. Monosodium phosphate for example is neutralized to a disodium phosphate, but not further in solution to trisodium phosphate. The latter substance does not exist per se in water solution, being hydrolyzed therein to caustic soda and disodium phosphate. Since the existence of any substantial quantity of caustic soda as such, or of alkalinity, is incompatible with the presence of nitrous acid, the reactions do not proceed to incompatible products, but stop at an equilibrium condition for dissolved constituents, whatever the same may be.

Aside from the formation of nitrous acid it must be considered that the acid material added becomes in whole or in part neutralized. Tartaric acid may form an acid salt in the beginning and then if action continues the neutral tartrate salt will be formed. The course of this neutralization is a matter of common knowledge to chemists and needs no detailed explanation. Benzoic acid will form sodium benzoate which is known and permitted as a preservative. Salicylic acid likewise forms a salicylate, also a known preservative.

The presence of preservative in the pickle may inhibit or prevent the action of certain bacteria, and where this is desired the preservative acid material may be employed. Where the preservative is not such in character or strength as to inhibit a bacterial action, its use cuts down the time of curing so that the action of the bacteria is not so extensive. Where it is desired that certain bacteria act for producing some specific effect, such as breaking down a constituent of the meat or blood, or in creating a certain flavor, the invention may still be employed.

In selecting acids for the present invention there is a wide range for selection of an acid, or of an acid salt, the choice determining to a considerable extent the pH or hydrogen ion content of acid concentration, so as to provide a regulatory influence upon the various bacterial actions which may take place. According to the conditions prevailing, and extent of cure, the kind of flavor, etc., the conditions may vary. Those skilled in the art may readily adopt an arbitrary procedure and thus tend to follow a trend toward a distinctive flavor, like dairies have distinctive objectives. Bacterial innoculaton may be resorted to for predominance of particular strains.

The essential reactions may be permitted to take place before the product to be cured is placed in contact with the curing agent containing preservative acid material, or it may be placed in contact with curing agent devoid of preservative acid material. In the latter case, the preservative acid material may be added to the product in the process of being cured, thereby to inhibit further bacterial process and to hasten curing. Or if desired non-preservative acid may be added with the result that the curing step is hastened, thereby to lessen the time thereafter during which bacteria may act.

As an example of a pickle composition for curing green hams, the following materials may be used:

|  | Ounces |
|---|---|
| Sodium nitrite | 1.68 |
| Sodium nitrate | 1.12 |
| Sodium chloride | 185.20 |
| Anhydrous citric acid | 1.00 |

Other acid substance, such as other preservative acid materials herein named may be substituted in the above formula, and the amount may be increased from that given to as high as 10 ounces, or even less. The proportions of other materials given are merely exemplary of a working formula for a curing salt, and many others might be selected. It is also to be understood that sugar for curing hams may be added, or that more sodium chloride may be added. All these variations are well known in the art. The quantity of acid in the formula may be greatly increased to insure retention of some favorable hydrogen ion concentration in the acid range, wherein certain bacterial reactions are favored, and others inhibited.

The chloride, nitrate and nitrite may be first treated to jacket the nitrite and nitrate within sodium chloride to form the product above described, and then the solid acid may be admixed therewith. Where a liquid pickle is to be used, the above weights of materials may be dissolved in 9 gallons of water for treating hams.

The reactions ultimately involved in using the composition of the present invention take place between the acid and the nitrite. It is not material that exact reacting proportions be used, but it is preferred that the available acidity be greater than that equivalent to the amount of nitrite initially employed. Thus, there is left acid material to react with nitrite formed from nitrate. Furthermore, it is pointed out that proportions are not critical, because acid present in the meat, or formed in process, may be somewhat effective as it is in the prior art where the added acid is not employed.

Wherein I use the term "preservative" acid substance I intend to refer to either the acid material employed, or to a salt resulting therefrom, or to both, as having a preserving function. I do not intend to signify that the preserving function is absolute in action, to the extent of prohibiting all bacterial action, or inhibiting every bacterial reaction or every micro-organism. So long as the product of the curing process employing preservative has a longer life under the same conditions than without use of the preservative, then the function is a preserving one. For example, where the cured product contains sodium citrate, or sodium tartrate, or sodium malate, or sodium lactate, resulting from acid compounds of corresponding substances, the cured product has its desirable condition extended several days longer than is normally the case.

It is thus seen that the present invention involves the use of acids at certain times and places in the ordinary curing processes, and especially the use of preservative acid substances to give improved control over the speed of curing, and over the flavor of cured meats, blood and like substances. It is also to be understood that in spite of the fact that a preservative acid material is preferred, the invention also contemplates that an acid and a preservative may be used. Benzoic acid or citric acid, for examples, provide acidity for release of nitrous acid, but independently of this function they act as preservatives. Hence the invention contemplates that hydrochloric, nitric, sulphuric, acetic or other acid, together with sodium citrate, sodium benzoate, or other preservative salts, might be used, as will be readily appreciated by those skilled in the art.

In the accompanying claims these various aspects of the invention are set forth.

I claim:

1. A solid curing composition for meats and materials containing hemoglobin comprising solid acid substance, particles containing curing nitrite salt, and sodium chloride jackets surrounding said particles, said jackets being effective in the solid composition to separate the acid substance and the nitrite salt to avoid reaction between them in the presence of small amounts of water or moisture, whereby substantial loss of nitrite value is avoided.

2. A solid curing composition for meats and materials containing hemoglobin comprising solid acid substance, particles containing curing nitrite salt and nitrate salt and sodium chloride jackets surrounding said particles, said jackets being effective in the solid composition to separate the acid substance and the nitrite salt to avoid reaction between them in the presence of small amounts of water or moisture, whereby substantial loss of nitrite value is avoided.

3. A solid curing composition for meats and materials containing hemoglobin comprising anhydrous citric acid, particles containing curing nitrite salt, and sodium chloride jackets surrounding said particles, said jackets being effective in the solid composition to separate the acid substance and the nitrite salt to avoid reaction between them in the presence of small amounts of water or moisture, whereby substantial loss of nitrite value is avoided.

4. A solid curing composition for meats and materials containing hemoglobin comprising anhydrous citric acid, particles containing curing nitrite salt and nitrate salt and sodium chloride jackets surrounding said particles, said jackets being effective in the solid composition to separate the acid substance and the nitrite salt to avoid reaction between them in the presence of small amounts of water or moisture, whereby substantial loss of nitrite value is avoided.

5. A solid curing composition for meats and materials containing hemoglobin comprising solid tartaric acid, particles containing curing nitrite salt, and sodium chloride jackets surrounding said particles, said jackets being effective in the solid composition to separate the acid substance and the nitrite salt to avoid reaction between them in the presence of small amounts of water or moisture, whereby substantial loss of nitrite value is avoided.

6. A solid curing composition for meats and materials containing hemoglobin comprising monosodium acid phosphate, particles containing curing nitrite salt, and sodium chloride jackets surrounding said particles, said jackets being effective in the solid composition to separate the acid substance and the nitrite salt to avoid reaction between them in the presence of small amounts of water or moisture, whereby substantial loss of nitrite value is avoided.

LLOYD A. HALL.